Figure 1:
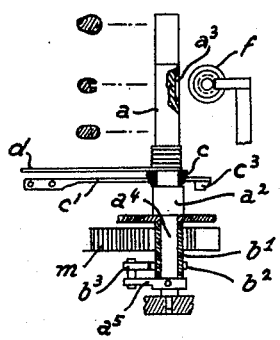

Dec. 25, 1923.    1,478,809
J. M. WEBER ET AL
MANUFACTURE OF CHAINS AND CHAIN MESHWORK
Filed Aug. 30, 1921    3 Sheets-Sheet 1

INVENTORS
Johann Martin Weber
Karl Betz
BY
Briesen Schrenk
ATTORNEYS

Dec. 25, 1923.                                                                    1,478,809
                          J. M. WEBER ET AL
              MANUFACTURE OF CHAINS AND CHAIN MESHWORK
                         Filed Aug. 30, 1921           3 Sheets-Sheet 2
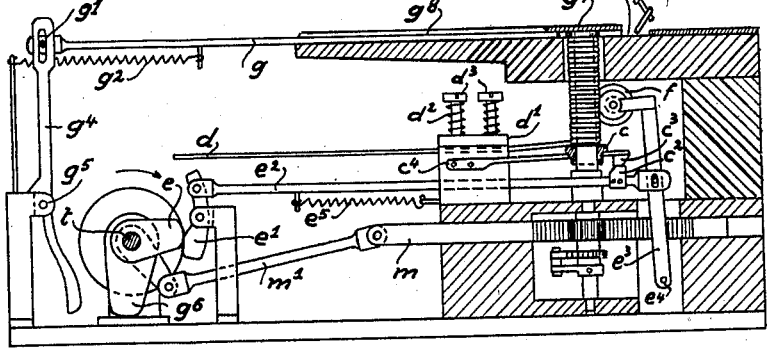
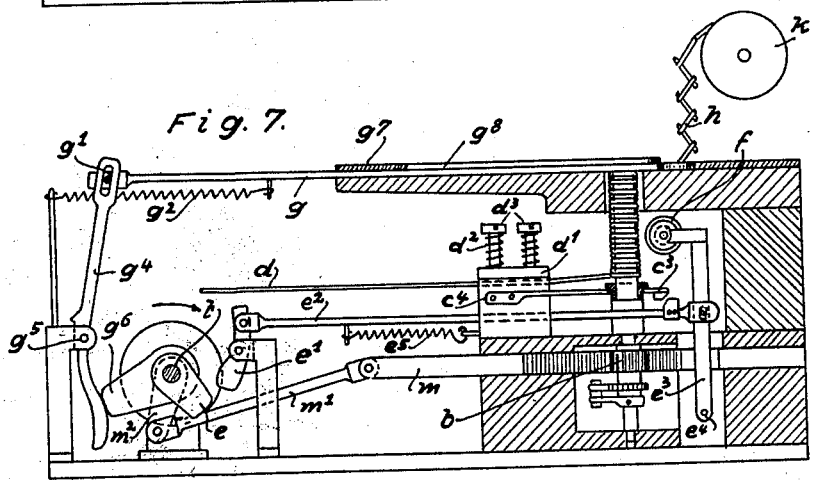
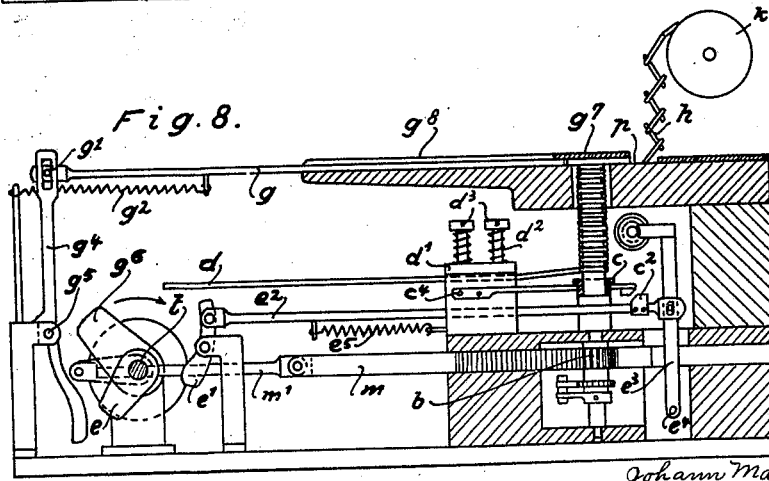
INVENTORS
Johann Martin Weber
Karl Betz
BY
ATTORNEYS Dec. 25, 1923. 1,478,809
J. M. WEBER ET AL
MANUFACTURE OF CHAINS AND CHAIN MESHWORK
Filed Aug. 30, 1921 3 Sheets-Sheet 3

INVENTORS
Johann Martin Weber
Karl Betz
BY
Briesen Schrenk.
ATTORNEYS

Patented Dec. 25, 1923.

1,478,809

UNITED STATES PATENT OFFICE.

JOHANN MARTIN WEBER AND KARL BETZ, OF FRANKFORT-ON-THE-MAIN, GERMANY, ASSIGNORS TO ERNST GIDEON BEK, OF PFORZHEIM, GERMANY.

MANUFACTURE OF CHAINS AND CHAIN MESHWORK.

Application filed August 30, 1921. Serial No. 496,927.

*To all whom it may concern:*

Be it known that we, JOHANN MARTIN WEBER and KARL BETZ, both citizens of the German Republic, residents of Frankfort-on-the-Main, Germany, have invented certain new and useful Improvements in the Manufacture of Chains and Chain Meshwork; and we do hereby declare the following to be a full, clear, and exact description of the invention, such as will enable others skilled in the art to which it appertains to make and use the same.

Applications for patents for this invention have been filed in Germany, March 11, 1920, France, March 9, 1921, Italy, February 9, 1921, Spain, February 23, 1921, Switzerland, March 24, 1921, Belgium, January 24, 1921, Sweden, February 3, 1921, England, February 3, 1921, Norway, March 15, 1921, Denmark, February 2, 1921, Austria, February 3, 1921, Czechoslovakia, February 4, 1921, Hungary, March 3, 1921, Holland, February 24, 1921, and Poland, March 11, 1921.

The invention concerns primarily the manufacture of chains and chain mesh work and in that connection its purpose is to form simultaneously a number of chain wires into rings and to intermesh these rings into the last formed series of rings by one automatic continuous process and if possible to effect this intermeshing as the series of rings is being formed.

It has already been suggested that the open rings should be manufactured on some kind of machine, to place them upon a series of pins, corresponding in number to the number of rings in one row of the mesh which is to be manufactured and to simultaneously remove them at the lower end of the pins, to insert each ring into the adjoining rings of the preceding series and then to close the rings. This, however, was not a continuous automatic process.

In the invention, each open ring is formed at one end of a pin, automatically moved along the shank of the pin, removed at the other end of the pin and led over to the last formed row of the rings and there, by a device of any well-known or approved construction, hooked in and closed.

The invention consists in means to effect the following series of steps:—

1. Winding of a wire at one end of an intermittently rotating pin.
2. Sliding the formed spirals along the shank of the pin.
3. Cutting the spirals at a certain point on the pin, whilst the pin is stationary.
4. Sliding the cut rings further towards the other end of the pin.
5. Distension of the rings in the cutting groove and flattening of the spiral into a plane by passing over a thickened part of the pin.
6. Removal of the last ring at the other end of the pin.
7. Moving the ring along by means of a slider on a guide plate to the place where it is joined to the preceding row.

This method can also be used in the manufacture of chains and offers great advantages for that purpose; the rings, particularly, become perfectly round without the use of a special pin for closing the ring joint.

The individual further improvements are made clear in the following description and drawings. The figures represent:

Fig. 1, pin in side elevation with various cross sections.

Figure 2:
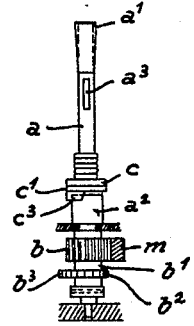

Fig. 2, front elevation of pin.

Figure 3:
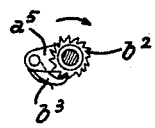
Figure 4:
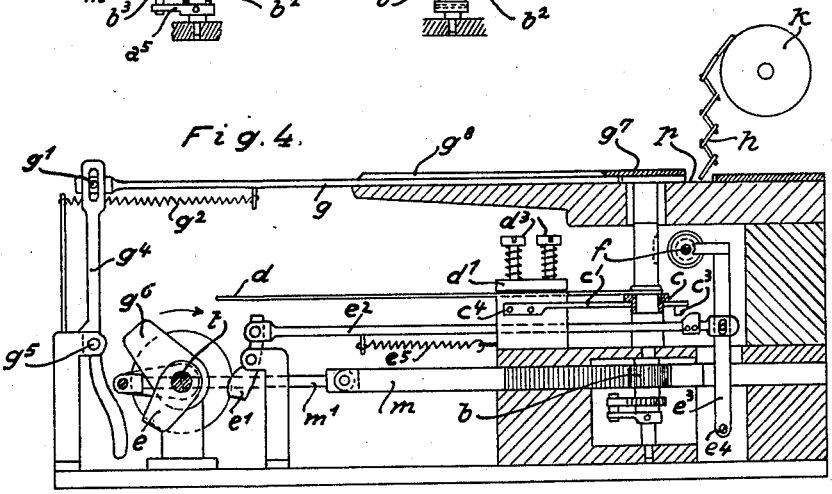
Figure 5:
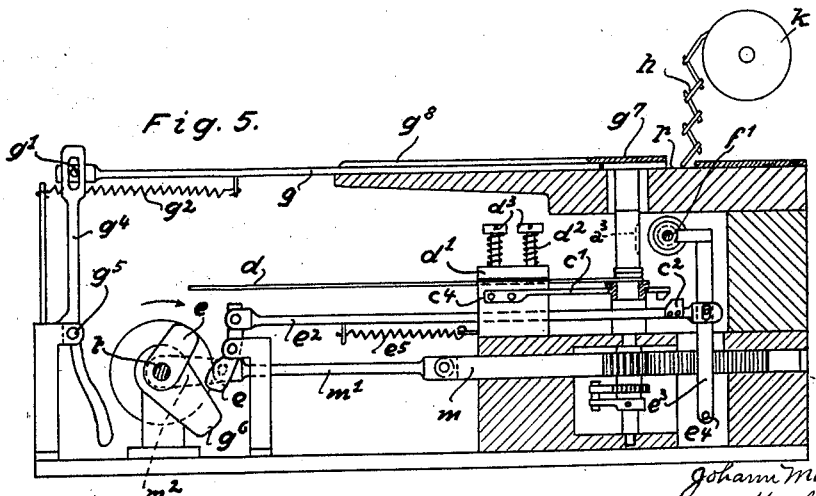

Fig. 3, plan of the gearing which effects the rotation of the pin.

Figs. 4 to 8, side views of the machine, partly in sections, at various stages of the work.

Figure 9:
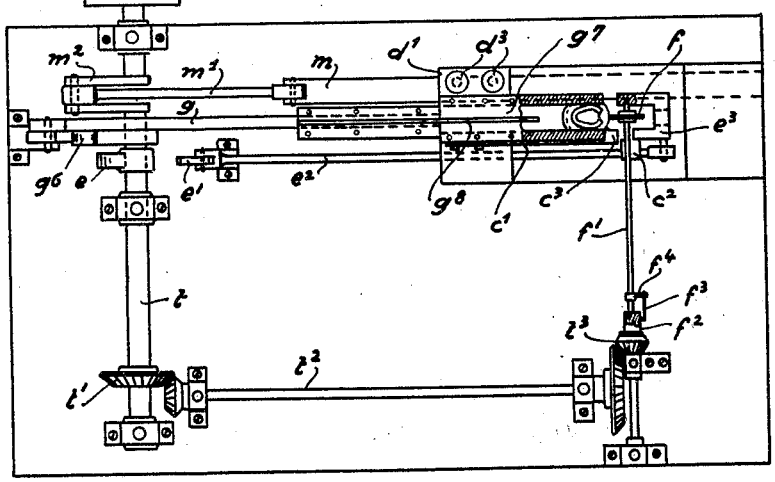

Fig. 9, plan of the machine.

Figure 10:
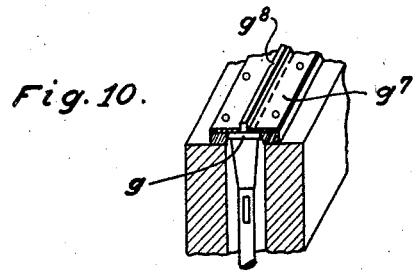

Fig. 10, a detail of the device for removing at the upper end of the pin.

In the first method of applying the machine, the process of forming the rings is as follows: (Figs. 1 and 2.)

At the lower end of the pin *a* the wire *d* is run on and with each revolution of the pin forms a turn corresponding to the oval cross section of the pin. This lowermost turn lies on a collar *c* which is able to move up and down to the extent of one thickness of the wire. The upward movement of the collar pushes the formed turn of wire up, the downward movement makes room for a new turn. The spiral, which is thus in process of forming, travels up the pin $a$ to a groove $a^3$ in the periphery of the pin, where it is cut by a saw $f$ or by some other means for this purpose moves towards the pin and effects the cutting by projecting into the groove $a^3$. The cut rings are pushed further up on to the thickened end $a'$ of the pin. This distends the ring sufficiently to be hooked into a single link of a chain or into two links of a piece of chain mesh-work.

Further, whilst the ring is thus forced over the end $a'$ of the pin the spiral twist is lost, making the ring plane. At the upper end of the pin the opened ring is finally drawn off by a slider and led to the position for intermeshing.

The intermittent rotation of the pin is produced by means of a toothed rod $m$, moving to and fro, which engages the toothed wheel $b$ on the sleeve $b'$ on the lower spindle $a^4$. On the sleeve $b'$ is secured the ratchet wheel $b^2$ into which engages the pawl $b^3$ rotatably mounted on the arm $a^5$ which arm is firmly connected to the lower end of the spindle $a^4$. In this way the pin makes a complete revolution when the rod $m$ moves forward and is stationary as the rod moves back.

The device for raising the collar $c$ consists of a spring arm $c'$ which engages under the projecting edge of the collar and is so fixed to the machine frame at $c^4$ that it acts downwards. The lift of this collar emanates from the cam $e$ on the driving shaft $t$. This cam engages the lever $e'$ and moves the rod $e^2$ against the pull of the spring $e^5$. The rod $e^2$ is at its other end attached to the lever $e^3$ which swings on the fulcrum $e^4$ and carries a wedge-piece $c^2$.

This wedge-piece $c^2$ on the return stroke of the rod $e^2$ under the influence of the spring $e^5$, strikes a corresponding wedge-piece $c^3$ on the arm $c'$ and raises this by about one thickness of the wire. The movement of the lever $e^3$ also serves the purpose of cutting the wire spirals. At its upper end is one of the bearings of the saw $f$ on the axle $f'$; the other bearing of the saw is in the end of the rotating shaft $f^2$; whence the saw receives its rotary motion through the fixed pin connections $f^3$, $f^4$. The movement of the lever $e^3$ moves the saw $f$ towards the pin and causes the saw to cut whilst the pin is stationary.

The shaft $f^2$ is rotated from the driving shaft $t$ through the cone wheel transmission drives $t'$, $t^2$, $t^3$. The wire $d$ runs on to the pin through a brake $d'$ which can be tightened and regulated by means of the screw $d^3$ and the springs $d^2$.

The winding of the wire on the pin under tension has the effect that the wire is not only securely and closely wound round the pin but also sets up further tensions in the wire when this is being bent which favour the straightening from the helical to the plane shape of the turn when cut.

As each ring is delivered at the upper end of the pin it is pushed to one side by a needle like slider $g$ on a guide plate $p$ and arrives at the last formed link of the chain $h$ as the latter is coiled on the chainwheel $k$. The movement of the slider $g$ emanates from the cam $g^6$ on the shaft $t$, which strikes the lever $g^4$ swinging on the fulcrum $g^5$ and in its turn operating on the pin $g'$ of the slider $g$ during the forward thrust, the backward thrust being effected by the spring $g^2$. The slider $g$ runs under a plate $g^7$ which has a guiding slot for the rib $g^8$ of the slider $g$ which plate $g^7$ prevents the ring being moved out of the plane of the guide plate $p$ after the ring has been removed from the end of the pin, as the distance between the upper end of the pin and the plate $g^7$ amounts only to the thickness of a wire.

The movement to and fro of the toothed rod $m$ is transmitted from the shaft $t$ by the connecting rod $m'$ and the crank $m^2$.

It is obvious that the machine can be used not only for the manufacture of single chains, but that it is also suitable for the continuous production of chain mesh-work, if the number of pins be multiplied.

One advantage of rings made in this way is their irreproachably round shape and the exactitude of the joint.

It is obvious that this method of applying the invention admits of various modifications; for instance, the rings may under certain circumstances be distended after removal from the pin or during such removal. The groove in the pin for cutting the spirals may, under certain circumstances, be a mere bevel, which also fills the purpose of facilitating a smooth and complete cut by the cutter through the whole thickness of wire. The saw may be replaced by other cutting devices. The intermittent rotation of the pin may be effected by other means than a feeding device.

Now what we claim and desire to secure by Letters Patent is the following:—

1. In a machine for the manufacture of chains and chain mesh-work the combination of an intermittently rotating pin, with means to feed a wire to one end of the pin, means to shift the coil of wire so formed to the other end of the pin, means to cut the coil while on the pin into individual rings, means to remove the rings from the other end of the pin and means to feed the removed rings toward the rings previously formed.

2. In a machine as described in claim 1, means to open the individual rings after cutting the coil.

3. In a machine as described in claim 2, said intermittently rotating pin being provided with a gradually tapering thickening.

4. In a machine as described in claim 1, said cutting device being provided with means to move it towards the coil on the pin, whilst in its stationary position.

5. In a machine as described in claim 1, said cutting device being provided with means to move it towards the coil on the pin, whilst in its stationary position and a recess on the pin at the place where the cutting takes place.

6. A machine as claimed in claim 5, said cutting device consisting of a circular saw fixed on a rocking shaft.

7. In a machine as described in claim 1, said shifting means comprising a collar at the lower end of the pin capable of an axial rocking movement on the pin equal to one thickness of wire.

8. A machine as claimed in claim 1, said ring feeding means comprising a slider consisting of a plate which serves as a guide plate for the slider and limits the upward movement of the removed ring.

In testimony whereof we affix our signatures. Frankfort-on-the-Main this 8th day of August, 1921.

JOHANN MARTIN WEBER.
KARL BETZ.